United States Patent [19]

Heiress

[11] 3,793,711
[45] Feb. 26, 1974

[54] METHOD OF MAKING THE PROBE ASSEMBLY OF A TEMPERATURE SENSOR

[75] Inventor: Steven J. Heiress, Chicago, Ill.
[73] Assignee: V.A.C. Industries, Inc., Chicago, Ill.
[22] Filed: Apr. 14, 1972
[21] Appl. No.: 243,969

[52] U.S. Cl............... 29/595, 29/470.5, 29/523, 148/127
[51] Int. Cl............................................ G01r 3/00
[58] Field of Search .. 29/523, 470.5, 595; 148/12.7, 148/142, 127, 158; 338/28

[56] References Cited
UNITED STATES PATENTS

| | | | |
|---|---|---|---|
| 2,588,014 | 3/1952 | Knudsen | 338/28 |
| 3,203,451 | 8/1965 | Vincent | 29/523 X |
| 3,390,023 | 6/1968 | Shira | 148/127 |
| 3,412,565 | 11/1968 | Lindsey et al. | 29/523 X |

Primary Examiner—Charlie T. Moon
Attorney, Agent, or Firm—Lloyd L. Zickert

[57] ABSTRACT

A temperature sensor for sensing the temperature of air moving at low velocity including a transducer assembly having a temperature transducer element in association with a shield or case capable of having fast response and a high degree of accuracy at a specified temperature. The temperature transducer element includes a bobbin of plastic film over which wire sensitive to temperature is wound. A cover is provided over the wire, also of plastic film, and is bonded to the wire as is the bobbin to provide a stable assembly capable of withstanding severe shock and vibration. The invention also includes a method of making a temperature transducer assembly and in mounting it within a shield or case to avoid contamination with the air, while not sacrificing performance.

4 Claims, 22 Drawing Figures

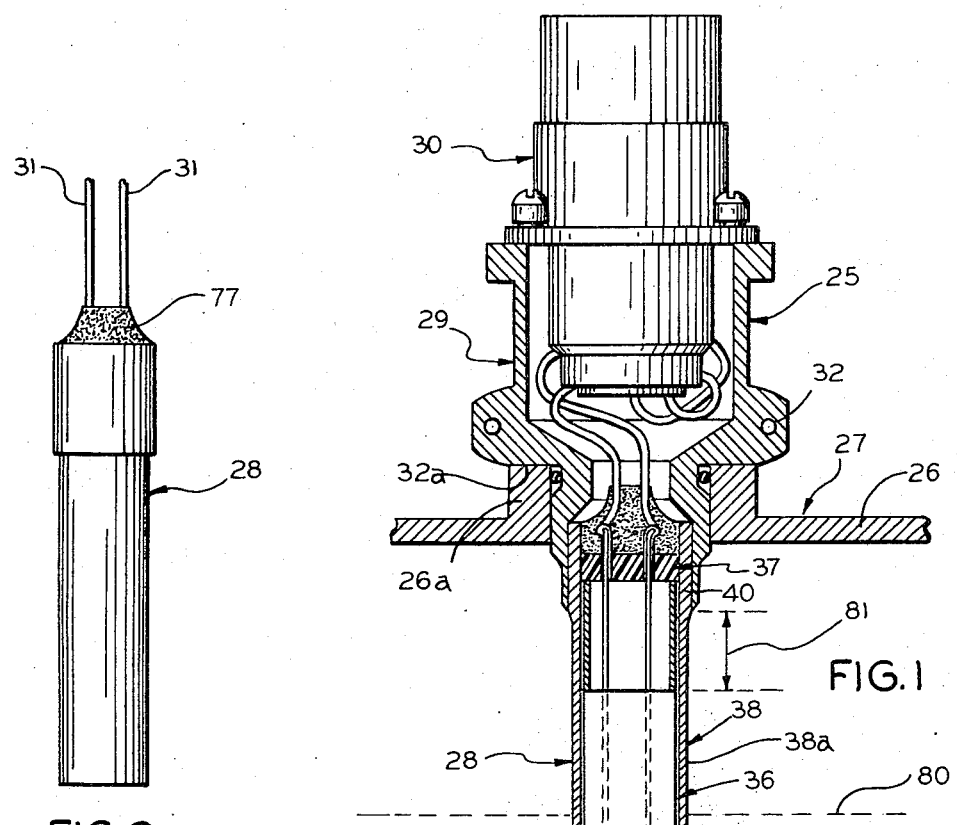
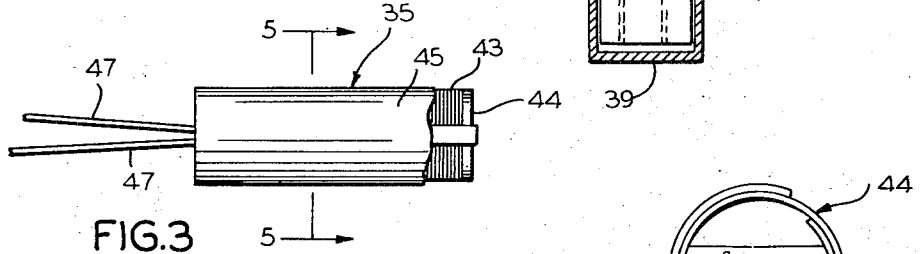
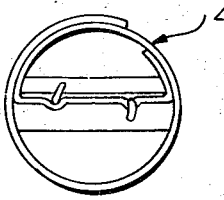
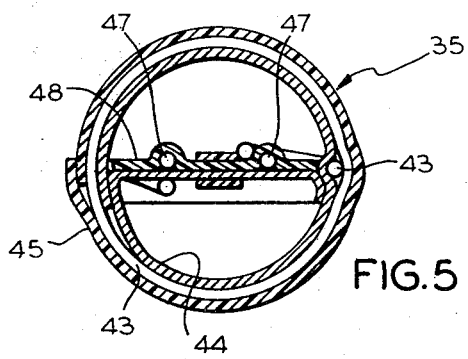

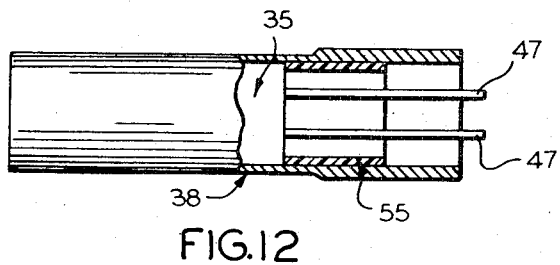
FIG.12
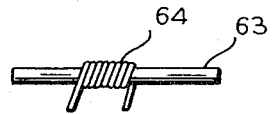
FIG.14
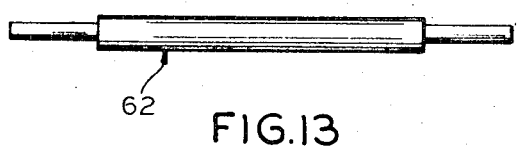
FIG.13
FIG.15
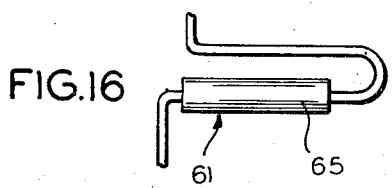
FIG.16
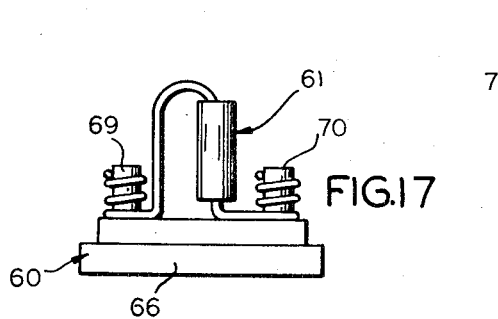
FIG.17   FIG.18
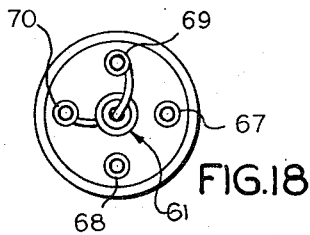
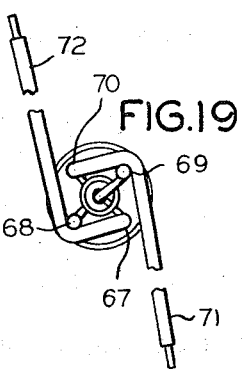
FIG.19
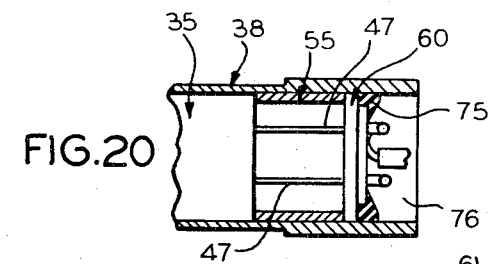
FIG.20
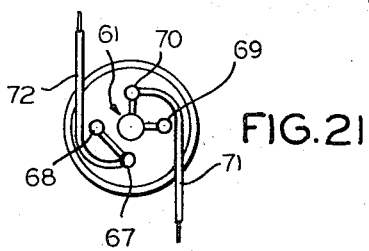
FIG.21
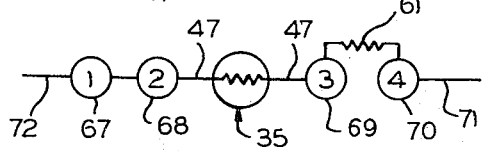
FIG.22

METHOD OF MAKING THE PROBE ASSEMBLY OF A TEMPERATURE SENSOR

This application is a divisional of my copending application, Ser. No. 54,106, filed July 13, 1970, now U.S. Pat. No. 3,735,322.

This invention relates in general to a temperature sensor, and more particularly to a sensor for detecting the temperature of low velocity air moving in a duct, and still more particularly to a temperature sensor and method of making same.

With the advent of the need to control the temperature of low air flow in a duct precisely at a given temperature, it has been desirous to develop a sensor capable of meeting the requirements and being rugged enough to withstand the conditions of operation, which often include severe shock, vibration, and contaminated air flow.

Accordingly, the present invention includes a sensor adapted to be mounted within an air duct to sense the temperature of air moving through the duct at a low velocity, such as between 200 and 1200 feet per minute. The sensor constitutes a precision instrument having one-half degree accuracy at a specified temperature, there being no necessity for accuracy above and below the chosen temperature. The sensor includes a probe assembly having a temperature transducer element completely sealed against contaminated air flow, whereby its operation is not affected by the contaminents. The temperature transducer element includes a bobbin made of plastic film having good electrical insulation properties, which resistance temperature sensitive wire is wound to provide a given resistance at a given temperature so that it measures accurately at the given temperature. A cover in the form of insulating plastic film is arranged over the wound wire. Both the cover and bobbin are bonded to the wire to define an element where the wire is electrically insulated and supported to be vibration resistant. Preferably, the plastic film is Kapton, although any other suitable film may be used. The transducer element is inserted in a case which protects it against contaminents, and in order to attain high performance and response, the transducer element is made slightly larger than the inner diameter of the case, thereafter reduced in size by crimping to allow insertion, and then expanded to the inner surface of the case to place it in intimate contact with the case which is critical to performance.

It is therefore an object of the present invention to provide a new and improved temperature sensor.

Another object of this invention is in the provision of a temperature sensor especially capable of use in low velocity ducted air flow.

Another object of the present invention resides in the provision of a temperature sensor for low velocity ducted air flow which is capable of being accurate to within one-half a degree at a given operating temperature, and which can withstand severe shock and vibration without loss of accuracy.

A still further object of this invention is to provide a temperature sensor for low velocity ducted air flow capable of responding rapidly to temperature changes.

Another object of the invention is in the provision of a method of making a temperature transducer element, and a method of making a temperature sensor capable of providing highly accurate measuring performance of low velocity air flow.

Other objects, features and advantages of the invention will be apparent from the following detailed disclosure, taken in conjunction with the accompanying sheets of drawings, wherein like reference numerals refer to like parts, in which:

FIG. 1 is an axially sectional view taken through a temperature sensor according to the invention and illustrating its use in connection with a duct, showing some parts in full view for purposes of clarity;

FIG. 2 is an elevational view of the probe assembly of the temperature sensor according to the invention;

FIG. 3 is an elevational view of the temperature transducer element used in the probe assembly of FIG. 2, showing some parts cut away for purposes of clarity;

FIG. 4 is an end elevational view of the temperature transducer element of FIG. 3;

FIG. 5 is a transverse sectional view of the temperature transducer element, taken substantially along line 5—5 of FIG. 3;

FIG. 12 is a somewhat sectional view of the probe assembly illustrating a still further step in the assembly thereof by the addition of a spacer element;

FIG. 13 is an elevational view of a section of wire precut for preparing the trim resistor used to obtain a precise resistance value of the temperature transducer element where the insulation is removed from the ends which are then tinned, and resistance value being measured between the tinned ends;

FIG. 14 is a view illustrating the winding of the precut wire onto a mandrel to form a coil;

FIG. 15 is a view showing the coil as being removed from the mandrel;

FIG. 16 is a view illustrating the trim resistor in its final form wherein an insulating tube is applied over the coil form;

FIG. 17 is an elevational view of the trim resistor mounted onto the terminal cap;

FIG. 18 is a top plan view of the terminal cap and trim resistor of FIG. 17;

FIG. 19 illustrates the connecting of lead wires to the terminal cap;

FIG. 20 is a fragmentary sectional view illustrating the completed probe assembly where the terminal cap is shown in position within the case;

FIG. 21 is a top plan view of the completed probe assembly; and

FIG. 22 is an electrical schematic diagram of the probe assembly.

Figure 6:
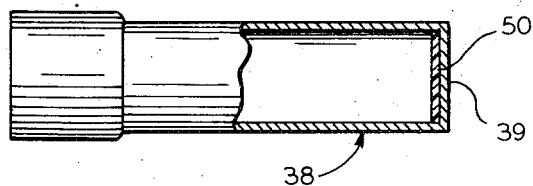
FIG. 6 is an elevational view of the case of the probe assembly, with some parts broken away to illustrate the first step of making the probe assembly.

Referring now to the drawings and particularly to FIG. 1, the sensor of the present invention is illustrated and generally designated as the numeral 25, and depicted as being mounted on a wall 26 of a duct 27, it being appreciated that the temperature sensor is principally useful in the sensing of a low velocity air flow in a duct, wherein the velocity is in the range of 200 to 1,200 feet per minute. It should also be recognized that the temperature sensor of the invention could also be used to measure the temperature of ambient air or still air within a chamber.

The sensor 25 generally includes a probe assembly 28, a housing or fitting 29, and an electrical connector 30. The connector 30 allows the sensor to be connected into a suitable measuring and control circuit. The probe assembly 28 is shown in FIG. 2 prior to mounting of same in the housing 29, and it can be appreciated that connecting of the lead wires 31 to the connector 30 and a suitable securing of the input end in the housing defines the complete sensor assembly 25. The housing 29 is formed so that it may be threadedly mounted in a tapped boss 26a on the duct wall 26 to seated position against shoulder 32a of a flange 32 formed on the housing 29 so that the probe assembly is arranged within the duct 27 in a predetermined position to obtain the necessary temperature control response. It should be appreciated that the housing 29 can be formed in order to give the desired placement of the probe assembly within the duct depending upon the duct size.

The probe assembly 28 includes generally a temperature transducer element 35 arranged within a cylindrical casing or shield 36, and a terminal cap assembly 37 at the input end for sealing the transducer element 35 against the outside air. The casing 36 is cylindrical in shape and includes a cylindrical side wall 38 which is closed at one end by an end wall 39 and open at the other end. The casing is in the form of a suitable metal and having a wall thickness that is the function of the maximum duct pressure experienced so that the proper response can be obtained. For a given duct pressure, a given thickness would be employed, while a thicker wall would be used with a higher duct pressure. The input end of the casing is made slightly heavier at 40 to facilitate mounting of the probe assembly in the housing 29.

The temperature transducer element 35 includes a given length of temperature resistance sensitive wire 43 wound in the form of a coil, and so intimately associated with the inner surface of the casing 38 as to provide high performance and response and high accuracy especially at a given temperature. The wound wire 43 is supported on a bobbin 44 and insulated from the case 38 by a cover 45. The outer cover 45 and the bobbin 44 are constructed of a plastic film having good electrical insulating properties and flexibility so as to enable the wound wire to withstand shock and vibration. The outer surface of the bobbin 44 has a pressure sensitive adhesive coating thereon, while the inner surface of the outer cover 45 has a pressure sensitive coating thereon thereby bonding the wound wire 43 tightly to both the bobbin and the outer cover to provide a compact and structurally strong assembly.

A generally diametrically extending panel is provided within the bobbin 44 for the purpose of supporting lead wires 47. It will be appreciated that one of the lead wires 47 is suitably connected to one end of the wound wire 43, while the other lead wire is suitably connected to the other end of the wound wire. The formation of the bobbin 44 and the panel is accomplished from a single piece of plastic film that is formed on a mandrel of the proper shape. One type of plastic film found suitable, as above indicated, is Kapton, which has a pressure sensitive adhesive over one surface. A plastic holddown 48 secures the lead wires 47 onto the center panel.

The temperature transducer element 35 may be used without the case 38 where it need not have the protection of the metal enclosure, such as where it may be measuring the temperature of ambient or non-contaminated low velocity air flow. When used with the probe casing, the transducer element is fully protected against contamination, and can withstand severe shock and vibration without loss of accuracy. The bobbin and cover layers of plastic film for the sensing wire 43 provide high insulation resistance between the sensing wire and the probe shield 38. The first step in making of the transducer assembly, that of making the bobbin 44, is illustrated in FIG. 4. Thereafter, wire wound on the bobbin having a predetermined resistance at a given temperature and the connecting of the ends to the leads 47 together with the enclosing of the wound wire with the cover element 45 completes the transducer assembly. The sensing wire is fine and of a material having a high temperature coefficient of resistance characteristic. Preferably 99.99 percent pure nickel wire is used having good resistance characteristic stability with respect to service life and a temperature coefficient of resistance figure of 6,000 ohms per 1 million ohms per 1° centigrade.

The transducer element 35 is next inserted in the casing 38 in the assembly of the probe assembly. An insulating disc 50 is first inserted against the end wall 39 to further insulate the end of the transducer element from the casing.

Figure 7:
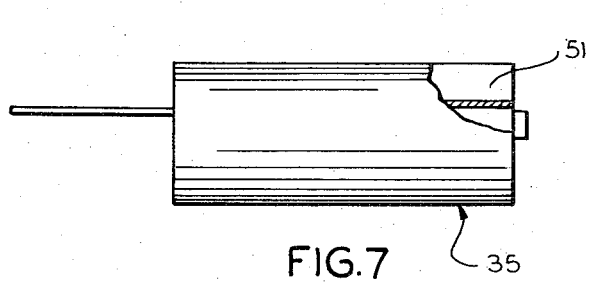
FIG. 7 is an elevational view of the temperature transducer element as formed to enable insertion into the case.
Figure 8:
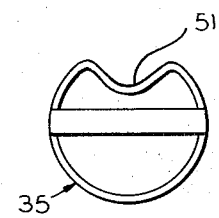
FIG. 8 is an end elevational view of the preformed transducer element of the invention.
Figure 9:
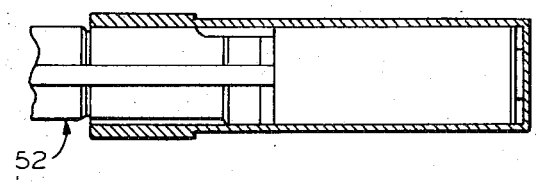
FIG. 9 is a view illustrating the insertion of the temperature transducer element into the case.
Figure 10:
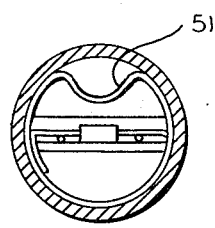
FIG. 10 is a generally transverse sectional view taken through the assembly of FIG. 9 and substantially along line 10—10 wherein the transducer element is deformed.
Figure 11:
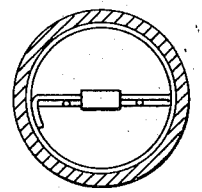
FIG. 11 is a view similar to FIG. 10 but illustrating the transducer element as expanded so that it is in intimate engagement with the inner surface of the case.

During the making of the transducer assembly 35, it is made so that the external diameter is slightly larger than the internal diameter of the casing. In order to insert the transducer element 35, it is first reduced in size diametrically by performing with a longitudinally extending fold or groove 51, FIGS. 7 and 8. This preforming may be accomplished by any suitable tool. With the diameter of the transducer element reduced smaller than the inner diameter of the casing 38, the transducer element may thereafter be easily inserted within the casing, FIG. 10, and thereafter the fold or groove 51 is expanded to expand the diameter of the transducer element so that its outer surface is in tight and intimate engagement with the casing wall as seen in FIG. 11. Any suitable tool may be provided for expanding of the transducer element to reform it so that it is in contact with the inner surface of the probe casing along the major axis. A reforming tool 52 is shown in FIG. 9 in the operative position for reforming of the transducer element. The intimate contact established between the transducer and the casing enables the high performance and quick response to temperature change.

In order to relieve any stresses in the wound wire that may have been caused by winding or by deforming and reforming the transducer element, the casing and transducer element are subjected to thermal aging, wherein they are heated to a predetermined temperature for a predetermined period of time. This also cures the adhesive and locks the transducer in place within the casing.

Following the installation of the transducer element 35 within the casing 38, a spacer element 55 is next inserted in abutting relation to the end of the transducer element, as shown in FIG. 12. The spacer element is of a suitable insulating material and is externally provided with a pressure sensitive adhesive, so that it can be held in place within the casing and maintained in proper position.

The probe assembly is now ready to be sealed and to be adjusted resistance-wise in order to provide the accuracy required for use thereafter at a given temperature. It is therefore necessary to determine the resistance of the transducer element at the operating temperature and bring the resistance figure to the predetermined point by the adding of a trim resistor. The trim resistor is next made and mounted on a terminal cap 60 of the terminal cap assembly 37. The trim resistor is generally designated in its completed form as shown in FIG. 17 by the numeral 61.

The trim resistor 61 is prepared by cutting a length of wire 62, FIG. 13, removing the insulation from the ends and tinning the ends. Thereafter, the wire 62 is wound around a mandrel 63 to form coil 64, FIG. 14. The coil 64 is then removed from the mandrel 63, FIG. 15, and the coil is enclosed by an insulating tube 65 to define the completed trim resistor 61, FIG. 16.

The terminal cap 60 includes a body 66 of insulating material, and four hollow metal terminals 67, 68, 69 and 70, projecting away from the upper end and being flush with the lower end. The trim resistor 61 is connected between the terminals 69 and 70, wherein the leads of the trim resistor are soldered to these terminals. Thereafter, lead wires 71 and 72 are soldered to terminals 67 and 70, FIG. 19. The transducer leads 47 are brought through and soldered to the terminals 68 and 69. Concurrently, the terminal cap assembly is inserted within the casing 38 against the spacer 55 as shown in FIG. 20. An adhesive bead 75 is then applied circumferentially of the terminal cap 60 and against the inner side wall of the casing 38 to hold the terminal wire assembly in place within the casing. Preferably, a silicone rubber adhesive is employed which is allowed to air cure. The annular seal of silicone rubber 75 then allows the solder flux to be washed from the terminals without contaminating the inside of the probe assembly. As seen in FIG. 20, a dead air space is defined between the terminal cap and the transducer assembly.

The cavity 76, FIG. 20, above the terminal cap assembly is thereafter potted with a suitable compound 77 to preclude moisture from degrading the transducer and to provide a mechanical wire lock for the lead wires 71 and 72 which have been identified in FIG. 2 as lead wires 31.

As seen in FIG. 1, a center line 80 represents the center of the duct 27, along which the center of the transducer co-extends, thereby placing the transducer in the center of the duct. The area along the probe assembly designated by the arrow 81 constitutes a thermal insulator for the transducer, whereby the air wipe of the air flow eliminates the influence of ambient on the accuracy of the transducer.

It will be understood that modifications and variations may be effected without departing from the scope of the novel concepts of the present invention, but it is understood that this application is to be limited only by the scope of the appended claims.

The invention is hereby claimed as follows:

1. The method of making the probe assembly of a temperature sensor wherein the probe assembly includes a cylindrical transducer assembly and a cylindrical casing having an inner diameter smaller than the outside diameter of the transducer assembly prior to assembly thereof comprising the steps of, constructing the transducer assembly, which includes forming a sheet of insulating plastic film coated on one side with a layer of pressure-sensitive adhesive into a cylindrical bobbin with the adhesive side facing outward, and winding resistance sensitive to temperature wire onto the adhesive layer of the bobbin, preforming the transducer assembly to reduce the diameter so that it will freely slide into the casing, which includes forming an inwardly extending longitudinal crease along the wire and bobbin to reduce the outside diameter thereof, inserting the transducer assembly into the casing, and reforming the transducer assembly within the casing by expanding same to eliminate the crease along the wire and bobbin and thereby seat the assembly into intimate contact with the casing.

2. The method as defined in claim 1, which further includes heating the casing and transducer assembly to a predetermined temperature for a predetermined period of time to relieve stresses in the transducer assembly, cure the adhesive, and lock the transducer assembly within the casing.

3. The method of making the probe assembly of a temperaure sensor wherein the probe assembly includes a cylindrical transducer assembly and a cylindrical casing having an inner diameter smaller than the outside diameter of the transducer assembly prior to assembly thereof comprising the steps of, constructing the transducer assembly, which includes forming a sheet of insulating plastic film coated on one side with a layer of pressure-sensitive adhesive into a cylindrical bobbin with the adhesive facing outward, winding resistance sensitive to temperature wire onto the adhesive layer of the bobbin, and applying a cover of insulating film coated on one side with a layer of pressure-sensitive adhesive over the wire with the adhesive side engaging the wire, preforming the transducer assembly to reduce the diameter so that it will freely slide into the casing, which includes forming an inwardly extending longitudinal crease along the cover, wire and bobbin to reduce the outside diameter thereof, inserting the transducer assembly into the casing, and reforming the transducer assembly within the casing by expanding same to eliminate the crease along the cover, wire and bobbin and thereby seat the assembly into intimate contact with the casing.

4. The method as defined in claim 3, which further includes heating the casing and transducer assembly to a predetermined temperature for a predetermined period of time to relieve stresses in the transducer assembly, cure the adhesive, and lock the transducer assembly within the casing.

* * * * *